United States Patent
Abali et al.

(10) Patent No.: US 6,712,276 B1
(45) Date of Patent: Mar. 30, 2004

(54) METHOD AND APPARATUS FOR AUTOMATED MEASUREMENT OF PROPERTIES OF PERISHABLE CONSUMER PRODUCTS

(75) Inventors: Bulent Abali, New York; Hubertus Franke, Cortlandt Manor; Mark Edwin Giampapa, Irvington, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,927

(22) Filed: Jan. 29, 1999

(51) Int. Cl.[7] .............................................. G06K 19/06
(52) U.S. Cl. ....................................... 235/492; 235/380
(58) Field of Search ................................. 235/383, 380, 235/492, 384, 487

(56) References Cited

U.S. PATENT DOCUMENTS

| | | | | |
|---|---|---|---|---|
| 4,952,928 A | * | 8/1990 | Carroll et al. | 340/825.54 |
| 5,280,159 A | | 1/1994 | Schultz et al. | 231/282 |
| 5,347,263 A | | 9/1994 | Carroll et al. | 340/572.1 |
| 5,499,017 A | * | 3/1996 | Biegel | 340/572 |
| 5,608,193 A | | 3/1997 | Almogaibil | 177/25.13 |
| 5,611,051 A | | 3/1997 | Pirelli | 395/210 |
| 5,640,002 A | * | 6/1997 | Ruppert et al. | 235/383 X |
| 5,697,061 A | * | 12/1997 | Kreuger et al. | 235/383 X |
| 5,729,697 A | * | 3/1998 | Schkolnick et al. | 235/383 X |
| 5,785,181 A | | 7/1998 | Quartararo, Jr. | 209/3.3 |
| 5,798,694 A | | 8/1998 | Reber et al. | 340/5 |
| 5,804,810 A | * | 9/1998 | Wolley et al. | 235/492 |
| 5,814,799 A | * | 9/1998 | Swartz et al. | 235/383 |

FOREIGN PATENT DOCUMENTS

| | | | | |
|---|---|---|---|---|
| EP | 0563713 | 10/1993 | | G07C/9/00 |
| FR | 2764977 | 6/1997 | | G01D/9/00 |
| GB | 2308947 | 7/1997 | | G06K/7/10 |

* cited by examiner

*Primary Examiner*—Karl D. Frech
(74) *Attorney, Agent, or Firm*—Douglas W. Cameron; Anne Vachon Dougherty

(57) ABSTRACT

A method and apparatus for reporting dynamic properties of a product using radio frequency identification device technology. With this invention, an electronic tag is equipped with a sensor which determines dynamic properties of a product when the tag is activated. The dynamic properties of the product are then either further processed into other dynamic properties. In any event either the former or the latter dynamic properties are then transmitted from the tag. Such dynamic properties could be the temperature of a product or the expiration date of the product derived from periodic measurements of the temperature of the product.

18 Claims, 3 Drawing Sheets

METHOD AND APPARATUS FOR AUTOMATED MEASUREMENT OF PROPERTIES OF PERISHABLE CONSUMER PRODUCTS

TECHNICAL FIELD

This invention relates to a method and apparatus for reporting dynamic product status information using Radio Frequency Identification Device (RFID) technology.

DESCRIPTION OF THE PRIOR ART

In storage units, such as a refrigerator, a medicine supply locker, or a warehouse, perishable items might exist that have expired or are near expiration. Examples of such are medical supplies, biological specimens or simply a carton of milk each with associated expiration dates. Similarly, containers might be near empty requiring the acquisition of new items to replenish the current stock. In general, the items in such a storage unit can be described by a set of measurable properties (e.g., expiration date, weight, temperature, etc.) which can be used to either determine further properties (e.g., expiration date can be a function of the temperature) or to initiate certain consumer actions (e.g., replenish stock, lower environmental temperature).

Inventory tracking systems using the RFID device have been identified by others. Related patents are U.S. Pat. Nos. 5,347,263, 5,280,159, 5,785,181, 5,611,051, 5,608,193. Best known is the EASY Pass System used at toll booths around the country. Such systems are based on passive devices, i.e. an ID is hard coded into an electronic tag which is interrogated using RFID technology when a vehicle passes by a toll booth. That ID is then used to charge the consumer account associated with the ID. However, there is a need for inventory tracking systems which incorporate active sensors to determine dynamic properties such as weight, temperature and expiration date information.

SUMMARY OF THE INVENTION

It is an object of this invention to determine and report on dynamic properties which can vary with environmental conditions of products using RFID technology. The current invention describes a method and an apparatus for determining dynamic properties of products and for transmitting these properties using RFID technology.

It is a more specific object of this invention to determine properties of perishable and consumable items and to transmit these properties using RFID technology. Such products include groceries and pharmaceutical products.

Accordingly, this invention includes an electronic tag reporting dynamic properties of a product, where the tag has at least one sensor for determining the dynamic properties of the product and transmitting the determined properties from the tag or storing the properties when the sensor is activated with a radio frequency identification (RFID) device.

This invention also provides for a method of reporting the dynamic properties of a product where the method comprises broadcasting an interrogation request, and activating a sensor by transmitting an activation signal from an RFID device, where the activation signal is transmitted in response to the interrogation request. Finally, sensory data or dynamic properties of the product are determined by the activated sensor.

Depending upon which sensor sub-units are integrated into the device or tag, different properties can be measured and sent to a digital assistant for off-line processing. The tag can be attached to the product by either the manufacturer or the consumer. For example, an electronic tag with a weight sensor is placed at the bottom of the container which is placed on a flat surface so that the device is capable of measuring the weight of the container. The digital assistant will periodically poll the tag on the container and retrieve information as to the weight of the container. In another example, an electronic tag with a temperature sensing device could be attached to a perishable item to determine its expiration date where the digital assistant will process the temperature measurements that are periodically sent to it.

The electronic tag could incorporate micro sensors that can be implemented with just a few micro electrical components that can fit onto a single chip. Further, these micro sensors are readily available on the market at low cost.

DESCRIPTION OF THE PREFERRED EMBODIMENT

Figure 1:
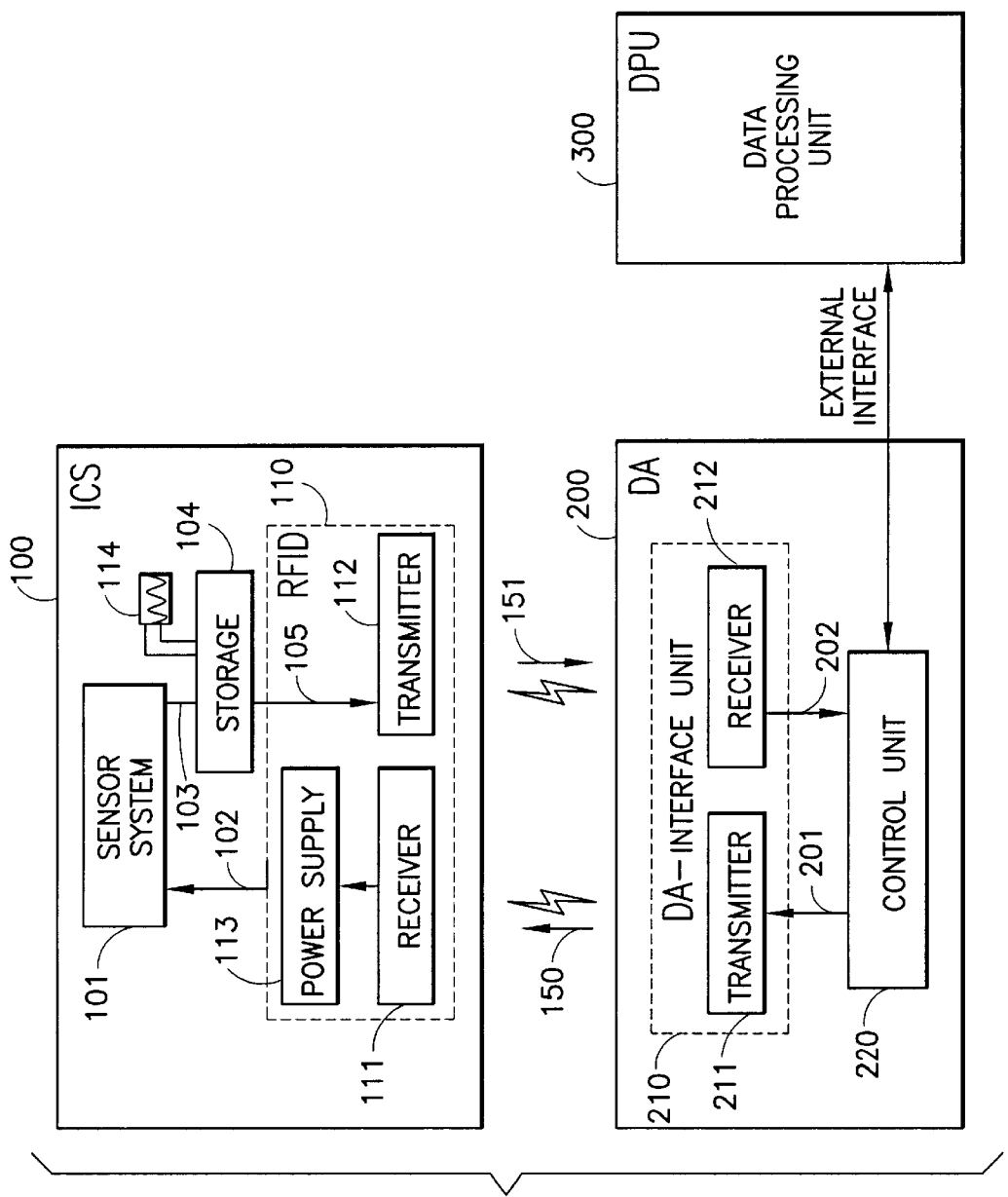
FIG. 1 schematically illustrates the integrated circuit sensor with the sensor system and the RFID. Dynamic Inventory and Property Tracking System according to the invention is the digital assistant and the data processing unit.

An Integrated Circuit Sensor (ICS), shown in FIG. 1, combines, preferably on a single chip (100): (i) a sensor system (101) (e.g. an electronic weight scale, a temperature sensor, biosensors), and (ii) a radio frequency identification device, a.k.a. RFID (110). The RFID typically includes a radio frequency receiver (111), a transmitter (112), and a power source (113). RFIDs are well known to those skilled in the art and are referenced below. The RFID is a radio frequency identifier which powers itself and connecting devices using power received from radio frequency waves (150) transmitted from an interrogating device, in our case the DA (200).

Furthermore, the RFID device identifies itself by replying (151) with a unique digital signature to the interrogating device, again in our case the DA (200).

The ICS (100) is integrated with the digital assistant DA (200) and optionally with an off-line data processing unit DPU (300). The DA's control unit (220), either being triggered externally by the DPU (300) or self triggered, periodically initiates (201) interactions with the ICS unit by broadcasting (150) an interrogation request, which is generated by a radio frequency activator (211) that is part of the interface unit (210). The control unit can be implemented using standard components such as a micro controller and memory well known to those skilled in the art. The radio frequency activates the RFID (110) through the receiver (111). The power supply (112) derives its energy from the RF signal (151) used to interrogate the ICS. Using the energy of the power supply, the sensor system (101) is activated (102). The details on how sensors provide their measurement are described further on in more detail. The sensor in turn supplies its measurement either directly back to the transmitter (111) or to an optional storage component (104), which utilizes an optional power supply (114) to hold values for longer periods of time. Dependent on the RFID technology used, this active power supply (114) could be utilized by the RFID as well. The ICS still powered by the interrogation signal (151) then reflects the unit identification embodied into the RFID together with the measurement back to the DA (152). The signal is received at the DA (212), demodulated and provided (202) to the control unit. Here the data is either stored, used for further data processing or forwarded to the DPU for further processing.

In an alternate embodiment, the optional power supply powers the sensor system either permanently or periodically without requiring power from the RFID to trigger measurement.

Information related to an item to which the ICS is attached, must be initially entered into the system. Various embodiments are possible. Information access identification can by encoded in the RFID. For instance, the ID could include a product information code. Examples of such ID encoding schemes are bar codes. Alternatively, a printed identifier on the storage container itself (e.g. Bar code) could be scanned and related to the RFID stored on the IC. Relating an item in the storage unit with information in the DA or the DPU can be done by sending an initial signal to the IC, receiving the response and correlating it in the DA or DPU's information processing unit with the product ID scanned using e.g. the bar code. Either way, the bar code information can than be used to access further product information. For instance, a sensor could consist of both an initial product date sensor and a temperature sensor. The product information accessible off-line could give additional information on how an expiration date is to be determined based on the temperature profile and the initial product date. Such information is crucial for biological/medical products.

Below are several examples of electronic sensors that supply simple measurements that can be integrated into an ICS. These are readily available market items.

Figure 2:
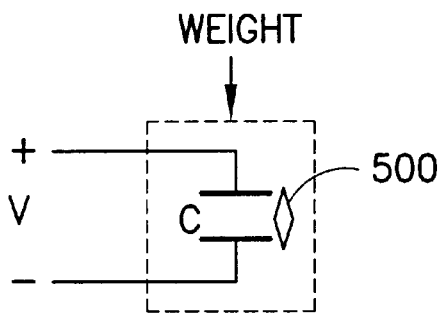
FIGS. 2–4 illustrate various sensing devices that could be used to implement this invention.

FIG. 2 shows the weight sensor implemented using a flat plate capacitor cell (500) whose capacitance will change when pressure is applied on the plates. In particular, the voltage that is generated stands in relation to the applied pressure, albeit not in a linear relation. In one embodiment, the ICS with pressure sensitive capacitor would be placed underneath the storage container, thus measuring the weight of the container. The capacitor requires a power source to charge it at the time of the measurement, but does not require a constant power supply.

Figure 3:
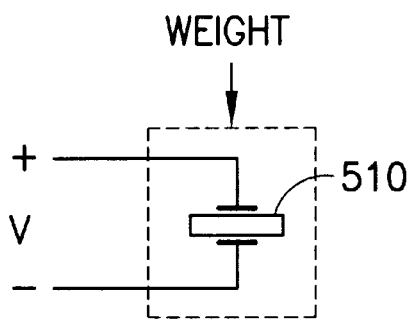

FIG. 3 shows the weight sensor implemented using a pressure sensitive piezoelectric transducer (510), which transforms mechanical pressure into electricity. In particular, the voltage stands in relation to the pressure, albeit not in a linear relation. The ICS with integrated piezoelectric transducer could be placed underneath the storage container, thus measuring the weight of the container when placed.

Figure 4:
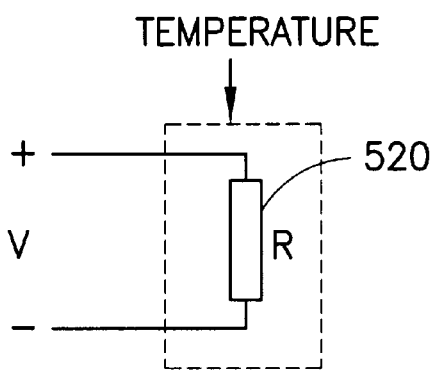

FIG. 4 shows how a temperature sensor can be implemented using a temperature sensitive resistor, a.k.a. thermistor (520). When supplied with power, the current, flowing through the resistor, is a function of the temperature surrounding the resistor.

The expiration date can depend on various environmental properties such as temperature and light. These properties have to be considered relative to some start date, such as a manufacturing date, packaging date, date of placement into the storage, etc.

The start date on the device may be recorded simply as a binary encoded string. This binary encoded string can be implemented with static memory, e.g. using bistable multi-vibrator technology or dynamic memory, either of which can be implemented with just a few transistors per bit. The expiration date is then dynamically updated based on observed sensor information and the start date.

Figure 5:
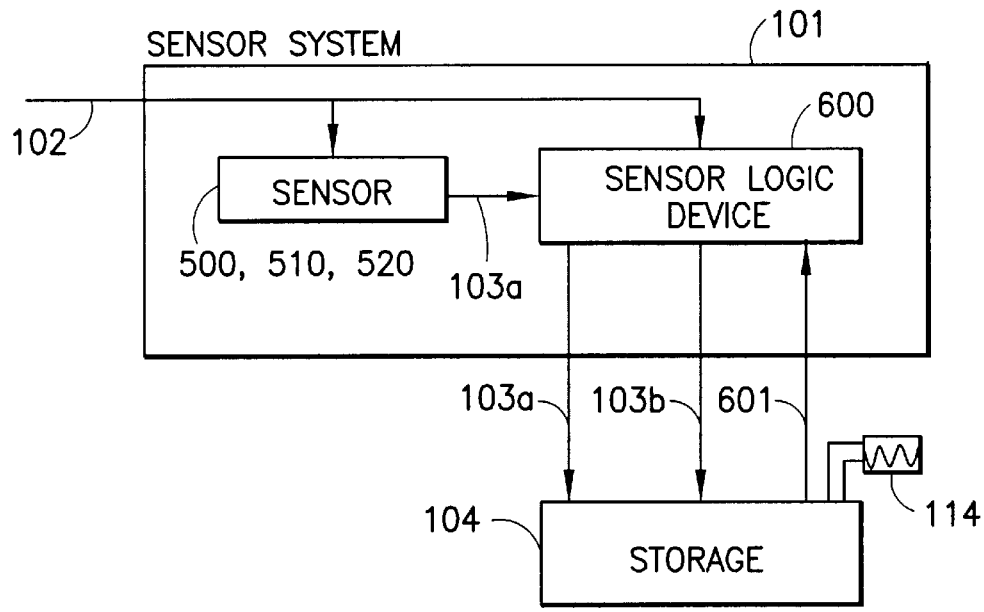
FIG. 5 schematically illustrates the sensor system of the ICS.

FIG. 5 illustrates the general design of a sensor system (101). This system utilizes the sensory data produced by a sensor, including but not limited to those sensors shown in FIGS. 2–4. This system also uses additional sensor system logic (600) to derive further dynamic product properties. When a sensor sub unit is activated by an activation signal (102) from the RFID, the sensor provides the sensory data to the sensor logic device, which then determines a set of derived properties. The sensor logic device than writes the sensory data and the set (103a, 103b) of derived properties via (103b) to storage (104). The RFID then transmits the sensory data and the product properties to the digital system (200). Alternatively, the sensor system could have a sensor device logic which first retrieves the last produced set of derived properties and makes incremental changes to that last set of properties before writing them back to memory (104). The latter alternative, however, would require an active power supply (114).

Figure 6:
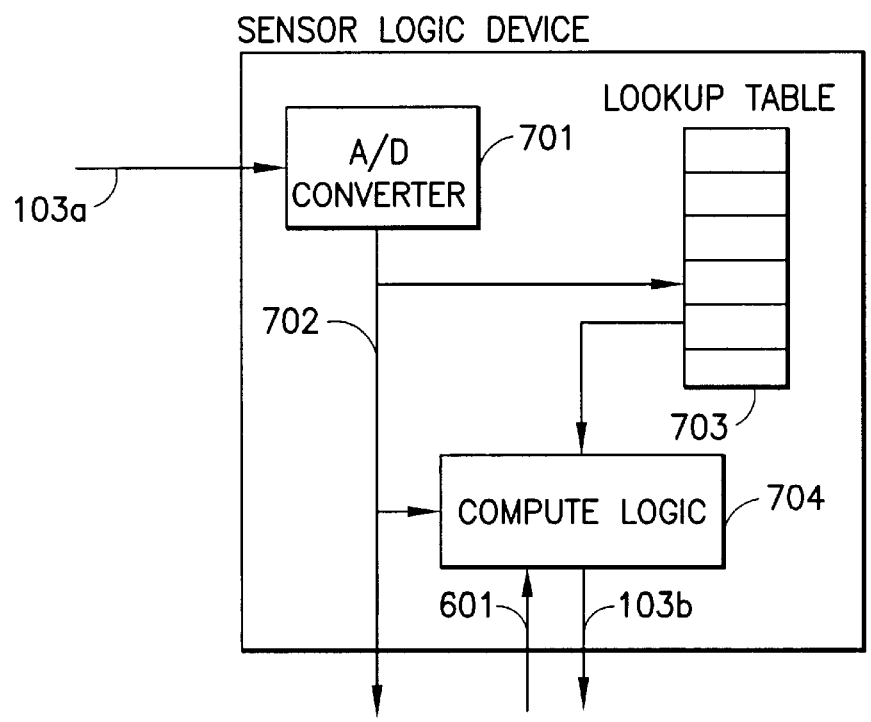
FIG. 6 schematically illustrates the sensor logic device of the sensor system.

In one embodiment of this invention, a dynamically adjusted expiration date derived by using a temperature sensor (520) and the sensor logic device (700) is shown in FIG. 6. The voltage signal received from the temperature sensor (103) is converted into a digital value (702) using A/D (analog to digital) converter logic (701). Then, this digital value (702) is used to perform a table lookup by indexing into a table (703) which maps the temperature into a change in the expiration date. Finally, the digital value is then forwarded to some additional compute logic (704) which computes the expiration date.

For example, the values stored in the table can be a rate of decay for the product to which the sensor system is attached. The compute logic can then retrieve a combination of the last stored values (601) of the computed expiration date, the time stamp and the last temperature and adjust the expiration date according with the algorithm encoded in the compute logic. The newly computed values (103b) are then written back to the storage.

Other sensors may be based on chemical decay, radio active decay, or biological activity (such as bacterial growth). The benefit of using these sensors, is that they can incorporate continuous changes rather than simply querying the device at discrete intervals.

All measurements can be directly used off-line or related to a product information sheet as described earlier in order to compute further properties. For example, the sensor data is sent to the digital assistant (200) which performs the computation of the expiration date in its control unit (220) or forwards the data to the data processing unit (300) for computation of the expiration date and other product management related activities, such as inventory control.

Off loading computationally intensive calculations can significantly reduce the complexity and cost of the ICS unit, in particular, the compute logic (704) of the Sensor Logic Device (600).

Having thus described our invention, what we claim as new and desire to secure by Letters Patent is:

1. An electronic tag for reporting dynamic properties of a product, said tag comprising:
   at least one sensor, which when activated senses physical data for said product;
   sensor logic for determining dynamic properties of said product from said physical data, said sensor logic additionally comprising a component for determining an expiration date as a function of dynamic properties and as a function of a fixed start date; and a radio frequency identification device for activating said sensor and for transmitting latter said dynamic properties from said tag.

2. An electronic tag as recited in claim 1, wherein said dynamic properties are derived based on physical data comprising sensory data.

3. An electronic tag as recited claim 1, wherein said dynamic properties are derived based on physical data comprising comprising at least one of the following: weight, temperature, and expiration date.

4. An electronic tag as recited claim 1, wherein said sensor comprises a device for measuring temperature.

5. An electronic tag as recited claim 4, wherein said device for measuring temperature comprises a thermistor.

6. An electronic tag as recited claim 4, wherein said device for measuring weight comprises a pressure sensitive capacitor.

7. An electronic tag as recited claim 1, wherein said sensor comprises a device for measuring weight.

8. An electronic tag as recited in claim 1 further comprising an internal power source.

9. An electronic tag reporting system for managing the handling of a product using dynamic properties of said product, said system comprising:

an electronic tag for reporting said dynamic properties of said product, said tag comprising:
at least one sensor for sensing physical data for said product, when said sensor is activated, sensor logic for determining said properties of said product, said sensor logic additionally comprising a component for determining an expiration date as a function of dynamic properties and as a function of a fixed start date, and a radio frequency identification device for activating said sensor; and
a digital assistant for processing said status information for product management.

10. A electronic tag reporting system as recited in claim 9, wherein said digital assistant comprises:

a transmitter and receiver for interrogating said tag for said dynamic product properties, and a control unit for processing said dynamic product status information.

11. An apparatus as recited in claim 10, wherein said control unit comprises determining an expiration date as a function of dynamic properties and as a function of a fixed start date.

12. A method for reporting dynamic properties of a product, said method comprising:

broadcasting an interrogation request;

activating a sensor by transmitting an activation signal from a radio frequency identification device, said activation signal being transmitted in response to said interrogation request;

determining said dynamic properties of said product by processing sensory data determined by said activated sensor; and determining an expiration date as a function of dynamic properties and as a function of a fixed start date.

13. The method of claim 12 further comprising storing values of said physical data and said dynamic properties.

14. The method of claim 13 further comprising the step of retrieving stored values for use in said determining dynamic properties of said product.

15. The method of claim 13 further comprising storing a fixed start date and further comprising retrieving stored values, retrieving said fixed start date and determining an expiration date as a function of dynamic properties, said stored values, and the fixed start date.

16. An electronic tag for determining dynamic properties of a product, said tag comprising:

at least one sensor, which when activated, senses physical data for said product;

sensor logic for determining dynamic properties of said product from said physical data, said sensor logic additionally comprising a component for determining an expiration date as a function of dynamic properties and as a function of a fixed start date; and a radio frequency identification device for activating said sensor.

17. An electronic tag as recited in claim 16, further comprising a memory for storing at least one of said physical data and said dynamic properties.

18. An electronic tag as recited in claim 17, further comprising a transmitter for transmitting said dynamic properties from said tag.

* * * * *